US009772919B2

(12) United States Patent
Rajagopal et al.

(10) Patent No.: US 9,772,919 B2
(45) Date of Patent: Sep. 26, 2017

(54) AUTOMATION OF D-BUS COMMUNICATION TESTING FOR BLUETOOTH PROFILES

(71) Applicant: Accenture Global Services Limited, Dublin (IE)

(72) Inventors: Vidya Rajagopal, Bangalore (IN); Divya Kilari Chandrababu naidu, Bangalore (IN); Marin Grace, Bangalore (IN); Sudhir Kudva, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 729 days.

(21) Appl. No.: 13/829,949

(22) Filed: Mar. 14, 2013

(65) Prior Publication Data
US 2014/0278199 A1   Sep. 18, 2014

(30) Foreign Application Priority Data

Mar. 14, 2013  (IN) .......................... 1087/CHE/2013

(51) Int. Cl.
G06F 11/273    (2006.01)
G06F 11/36     (2006.01)

(52) U.S. Cl.
CPC ...... *G06F 11/2733* (2013.01); *G06F 11/3668* (2013.01)

(58) Field of Classification Search
CPC ....................................................... G06F 8/30
(Continued)

(56) References Cited

U.S. PATENT DOCUMENTS 5,715,369 A    2/1998  Spoltman et al.
5,862,401 A    1/1999  Barclay, Jr.
(Continued)

FOREIGN PATENT DOCUMENTS

EP    2 190 239 A2    5/2010
EP       2190239       5/2010
(Continued)

OTHER PUBLICATIONS

Extended European Search Report issued in European application serial No. 14000928.3 on Jan. 13, 2015, 7 pages.
(Continued)

*Primary Examiner* — Alexander Satanovsky
*Assistant Examiner* — Felix Suarez
(74) *Attorney, Agent, or Firm* — Brinks Gilson & Lione

(57) ABSTRACT

An electronic control unit (ECU) is tested by an automated D-bus testing tool in a first device. The test tool establishes one or more secure shells between the first device and the ECU. The tool reads test input data from an Excel input file. The ECU comprises a software stack including a test client, a Bluetooth middle layer and a hardware abstraction layer, that communicate internally relative to the ECU, via a D-bus. The test tool sends function calls and parameters via the secure shells to the ECU to test execution of Bluetooth functions and/or Bluetooth profiles. The function calls enable simulation of a human machine interface by the test client. The tool monitors API call returns and logs D-bus communications via the one or more secure shells. The test tool outputs test verdict information and/or D-bus communication logs as text in an Excel file.

24 Claims, 5 Drawing Sheets

(58) Field of Classification Search
USPC ............ 702/108, 119, 121, 122, 123, 186; 379/1.01; 717/130
See application file for complete search history.

(56) References Cited

U.S. PATENT DOCUMENTS

| | | | |
|---|---|---|---|
| 6,091,802 | A | 7/2000 | Smith et al. |
| 6,285,924 | B1 | 9/2001 | Okamoto et al. |
| 6,421,793 | B1 | 7/2002 | Lester et al. |
| 6,622,121 | B1 | 9/2003 | Crepy et al. |
| 6,728,612 | B1 | 4/2004 | Carver et al. |
| 6,847,316 | B1 | 1/2005 | Keller |
| 6,978,198 | B2 | 12/2005 | Shi |
| 7,487,084 | B2 | 2/2009 | Aaron et al. |
| 7,529,545 | B2 | 5/2009 | Rader et al. |
| 7,562,019 | B2 | 7/2009 | Cohen et al. |
| 7,684,988 | B2 | 3/2010 | Barquilla |
| 7,917,260 | B2 | 3/2011 | Ubik et al. |
| 7,930,683 | B2 | 4/2011 | Li |
| 8,260,617 | B2 | 9/2012 | Dhanakshirur et al. |
| 8,690,325 | B1* | 4/2014 | Straus ............... A61B 5/117 349/12 |
| 2002/0077819 | A1 | 6/2002 | Girardo |
| 2003/0187639 | A1 | 10/2003 | Mills |
| 2003/0236672 | A1 | 12/2003 | Aaron et al. |
| 2004/0078104 | A1 | 4/2004 | Nguyen et al. |
| 2005/0197836 | A1 | 9/2005 | Cohen et al. |
| 2005/0278569 | A1 | 12/2005 | Srinivasan |
| 2006/0085187 | A1 | 4/2006 | Barquilla |
| 2007/0135187 | A1 | 6/2007 | Kreiner et al. |
| 2007/0220494 | A1* | 9/2007 | Spooner ............... G06F 8/30 717/130 |
| 2009/0199160 | A1 | 8/2009 | Vaitheeswaran |
| 2009/0271189 | A1 | 10/2009 | Agapi et al. |
| 2010/0256864 | A1 | 10/2010 | Ying |
| 2012/0032945 | A1* | 2/2012 | Dare ............... G06F 3/0481 345/418 |
| 2012/0128134 | A1* | 5/2012 | Pappas ............ H04M 3/2236 379/1.01 |
| 2012/0221893 | A1 | 8/2012 | Bai et al. |
| 2013/0152047 | A1* | 6/2013 | Moorthi ............ G06F 11/368 717/124 |
| 2013/0179164 | A1 | 7/2013 | Dennis |
| 2013/0201316 | A1 | 8/2013 | Binder et al. |
| 2014/0012587 | A1 | 1/2014 | Park |

FOREIGN PATENT DOCUMENTS

| | | |
|---|---|---|
| EP | 1936607 | 7/2012 |
| KR | 20030002999 A | 1/2003 |
| WO | WO 2005/070092 A2 | 8/2005 |
| WO | WO2005/070092 A2 | 8/2005 |
| WO | WO 2010/088085 A1 | 8/2010 |

OTHER PUBLICATIONS

Extended European Search Report issued in European application serial No. 14000927.5 on Oct. 29, 2014, 6 pages.

Mark Jewell and Steven Bird, AmFax Ltd. and David A. Hall, National Instruments, "Parallel Processing Techniques Reduce Cellular Test Time"; pp. 1-11; Nov. 2007 http://www.evaluationengineering.com/articles/200711/parallel-processing-techniques-reduce-cellular-test-time.php.

AmFax PXI-Based Bluetooth Measurement Suite; National Instruments, pp. 1, Nov. 9, 2012; http://sine.ni.com/nipdfgenerator/nipdfgenerator?pageURL=http://www.ni.com/white-paper/3857/en&clientAppName=dz&dotsPerPixel=&dotsPerPoint.

Wipro BITE—Bluetooth Qualification Test Systems; pp. 1-2; Wipro Technologies; 2010; http://www.wipro.com/Documents/resource-center/library/wireless_test_lab_bluetoothv5.pdf.

"Harald: A nano-framework for testing and monitoring Bluetooth adapters and devices on Linux"; pp. 1-32; Technetra, Jan. 2009; http://www.technetra.com/2009/01.

"Agilent Technologies E1852A Bluetooth Test Set"; Agilent Technologies ; pp. 1-4, May 31, 2001; http://cp.literature.agilent.com/litweb/pdf/5988-1978EN.pdf.

"Using KTimetracker"; KDE.org; pp. 1-3; Nov. 28, 2012 http://docs.kde.org/stable/en/kdepim/ktimetracker/interfaces.html.

Bluetooth Profile Tuning Suite; pp. 1-2; Nov. 28, 2012; http://developer.bluetooth.org/DevelopmentResources/Pages/TOOLS.aspx.

"GL Announces Testing Solutions for IVR—Interactive Voice Response Systems," pp. 1-3; Oct. 26, 2012; http://news.yahoo.com/gl-announces-testing-solutions-ivr-interactive-voice-response-085525884.html.

"Speech Recognition Solutions," p. 1; Nov. 2, 2012; http://www.nuance.com/for-individuals/by-solution/speech-recognition_/index.htm.

"Compilation of unification grammars with compositions semantics to speech recognition packages," pp. 1-2; 2002; http://dl.acm.org/citation.cfm?id=1072228&coll=DL&dl=GUIDE&CFID=191339550&CFTOKEN=36164743.

"Speech Recognition in the human-computer interface," pp. 1-2, Jul. 2003; http://dl.acm.org/citation.cfm?id=871490.871493&coll=DL&dl=GUIDE&CFID=191339550&CFTOKEN=36164743.

Canadian Office Action issued in Canadian App. No. 2,846,316, dated Jun. 3, 2015, pp. 1-4.

Canadian OA1 to Canadian Application No. 2,846,069, dated Oct. 29, 2015, (3p).

Canadian OA2 to Canadian Application No. 2,846,316, dated Jun. 23, 2016 (4p).

* cited by examiner

AUTOMATION OF D-BUS COMMUNICATION TESTING FOR BLUETOOTH PROFILES

BACKGROUND OF THE INVENTION

1. Technical Field

This disclosure relates to testing Bluetooth systems. In particular, this disclosure relates to testing electronic equipment that utilizes Bluetooth technology, such as electronic equipment in a motor vehicle.

2. Related Art

Hands-free systems, for example, voice based systems, may respond to audible commands and perform specified actions without manual or touch control by a user. Some hands-free systems may work with one or more other devices to complete an action such as making a phone call, changing a radio station, interacting with a navigation system or interacting with other telematics services. In some systems, a hands-free module may communicate with another device via a communications bus, such as a control area network (CAN) bus. For example, a hands-free module installed in a vehicle may respond to a user's voice command to change a radio station and may transmit a message over a control area network to a radio and/or a display screen to change the station. In another example, a hands-free module may respond to a user's voice command, such as "call Smith." The hands-free module may communicate via Bluetooth technology or another wireless or wired technology, with a mobile phone to initiate a phone call. While the phone is being controlled by the hands-free module, a microphone, speaker and/or display unit of the hands-free module may function in place of such interfaces of the mobile phone. In instances when the hands-free module is installed in an automobile, the microphone may be located in a rear view mirror, or the display and speaker unit may be installed in a dashboard, for example. Other controls may also interact with the hands-free module, for example, manual controls in a steering wheel or associated with a display unit may be utilized to activate the hands-free module. As voice based systems become more sophisticated and numerous, improved automated testing techniques are desirable.

BACKGROUND OF THE INVENTION

An automated testing tool hosted by a first device may conduct testing of Bluetooth operations and Bluetooth profiles in a second device. The automated testing tool may establish one or more secure shell sessions with the second device. The automated testing tool may read input data from text in an input file for testing operations of the second device. The second device may comprise two or more layers of software, including a Bluetooth module, which may communicate via a D-bus. One or more function calls for testing operations of the second device may be sent to the second device via one or more of the secure shell sessions, based on the read test input data. The automated testing tool may receive return information from the second device via one or more of the secure shell sessions. The return information may correspond to the operations of the second device which may be responsive to the one or more function calls for testing operations of the second device. The automated testing tool may output text in an output file comprising one or both of test verdict information corresponding to testing the operations of the second device, and all or a portion of the return information received from the second device.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
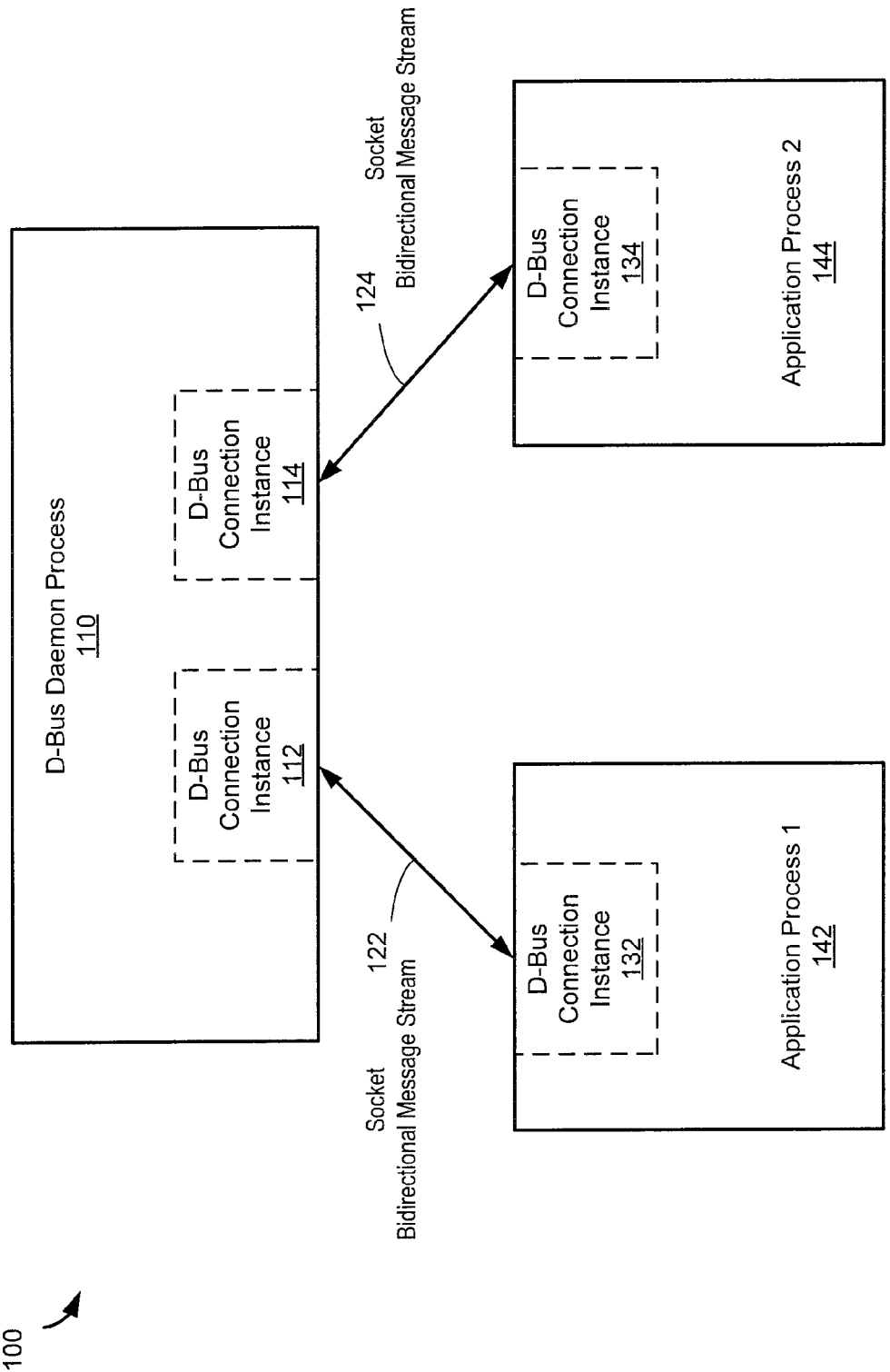
FIG. 1 is a representative block diagram of one embodiment of a D-bus interprocess communication system.

An automated test solution in a first device may communicate with a second device comprising an electronic control unit (ECU). The automated test solution may instruct the ECU to perform one or more actions in order to test Bluetooth profiles utilized by the ECU. Responses to the instructions may result in communication among layers of a software stack in the ECU via a D-bus. The software stack may include a test client, a Bluetooth module and/or a hardware abstraction layer. The test instructions may enable communication between the ECU and a third device, for example, a mobile phone, via a Bluetooth radio. The responses may be monitored via one or more secure shells established between the first device and the ECU and may be logged by the automated test system in the first device. The automated test system may determine success or failure of the ECU test. In some systems, input to the automated test solution may be provided by an Excel spreadsheet which may be read by the automated test solution. In addition, test results may be output by the automated test solution in an Excel spread sheet.

In a first aspect, one embodiment of the invention is a method for testing operations in an electronic control unit. The method may include an automated testing tool hosted by a first device establishing one or more secure shell sessions with a second device. Test input data may be read from text in an input file, for testing operations of the second device. The second device may comprise two or more layers of software, including a Bluetooth module, which may communicate via a D-bus. One or more function calls for testing operations of the second device may be sent to the second device via one or more of the secure shell sessions, based on the read test input data. The automated testing tool may receive return information from the second device via one or more of the secure shell sessions. The return information may correspond to the operations of the second device which may be responsive to the one or more function calls for testing operations of the second device. The automated testing tool may output text in an output file comprising one or both of verdict information corresponding to testing of operations of the second device, and all or a portion of the return information received from the second device. One or more test parameters corresponding to the one or more function calls may be sent to the second device via one or more of the secure shell sessions, based on the read test input data. In some systems, the one or more function calls sent to the second device may enable at least one of the two or more layers of software to simulate a human machine interface module. The one or more function calls for testing the operations of the second device may be sent from at least one of the two or more layers of software in the second device via the D-bus to the Bluetooth module. The function calls may enable communicating via a Bluetooth radio to control operations in a third device communicatively coupled to the Bluetooth radio. The one or more secure shell sessions may comprise three secure shell sessions between the first device and the second device. The three secure shell sessions may be concurrently maintained in parallel by the automated testing tool to send commands to the second device and to monitor operations of the second device which may be responsive to the one or more function calls for testing operations of the second device. The return information may comprise information communicated to or from the Bluetooth module via the D-bus which may correspond to the one or more function calls. The automated testing tool may compare expected responses from the text in the read test input file to the received return information from the second device to determine the test verdict information. The first device and the second device may be communicatively coupled via a first mobile phone and a second mobile phone. Based on the read test input data, the automated testing tool may be operable to verify Bluetooth operations of the second device utilizing a call initiated, automatically by the automated testing tool, in the first mobile phone to the second mobile phone, or a call initiated, automatically by the automated testing tool, in the second mobile phone to the first mobile phone. The second device may comprise an electronic control unit (ECU) for a vehicle. The operations of the second device may include communication via the D-bus with the Bluetooth module based on one or more Bluetooth profiles. The operations may occur after receiving, by the second device, one or more of an audible voice command, a command in a wireless signal, a command in an optical signal or a command in a wire line signal.

In a second aspect, another embodiment of the invention is a system for testing operations in an electronic control unit. The system may comprise one or more circuits or processors in a first device. The one or more circuits or processors may be operable to, in an automated testing tool hosted by the first device, establish one or more secure shell sessions with a second device. Test input data may be read from text in an input file, for testing operations of the second device. The second device may comprise two or more layers of software, including a Bluetooth module, which may communicate via a D-bus. One or more function calls for testing operations of the second device may be sent to the second device via one or more of the secure shell sessions, based on the read test input data. The automated testing tool may receive return information from the second device via one or more of the secure shell sessions. The return information may correspond to the operations of the second device which may be responsive to the one or more function calls for testing operations of the second device. The automated testing tool may output text in an output file comprising one or both of verdict information corresponding to testing of operations of the second device, and all or a portion of the return information received from the second device. One or more test parameters corresponding to the one or more function calls may be sent to the second device via one or more of the secure shell sessions, based on the read test input data. In some systems, the one or more function calls sent to the second device may enable at least one of the two or more layers of software to simulate a human machine interface module. The one or more function calls for testing the operations of the second device may be sent from at least one of the two or more layers of software in the second device via the D-bus to the Bluetooth module. The function calls may enable communicating via a Bluetooth radio to control operations in a third device communicatively coupled to the Bluetooth radio. The one or more secure shell sessions may comprise three secure shell sessions between the first device and the second device. The three secure shell sessions may be concurrently maintained in parallel by the automated testing tool to send commands to the second device and to monitor operations of the second device which may be responsive to the one or more function calls for testing operations of the second device. The return information may comprise information communicated to or from the Bluetooth module via the D-bus which may correspond to the one or more function calls. The automated testing tool may compare expected responses from the text in the read test input file to the received return information from the second device to determine the test verdict information. The first device and the second device may be communicatively coupled via a first mobile phone and a second mobile phone. Based on the read test input data, the automated testing tool may be operable to verify Bluetooth operations of the second device utilizing a call initiated, automatically by the automated testing tool, in the first mobile phone to the second mobile phone, or a call initiated, automatically by the automated testing tool, in the second mobile phone to the first mobile phone. The second device may comprise an electronic control unit (ECU) for a vehicle. The operations of the second device may include communication via the D-bus with the Bluetooth module based on one or more Bluetooth profiles. The operations may occur after receiving, by the second device, one or more of an audible voice command, a command in a wireless signal, a command in an optical signal or a command in a wire line signal.

In a third aspect, still another embodiment of the invention is a non-transitory computer readable medium having stored thereon one or more instructions for testing operations in an electronic control unit. The one or more instructions may be executable by one or more processors to cause the one or more processors to perform steps comprising, in an automated testing tool hosted by a first device, establishing one or more secure shell sessions with a second device. Test input data may be read from text in an input file, for testing operations of the second device. The second device may comprise two or more layers of software, including a Bluetooth module, which may communicate via a D-bus. One or more function calls for testing operations of the second device may be sent to the second device via one or more of the secure shell sessions, based on the read test input data. The automated testing tool may receive return information from the second device via one or more of the secure shell sessions. The return information may correspond to the operations of the second device which may be responsive to the one or more function calls for testing operations of the second device. The automated testing tool may output text in an output file comprising one or both of verdict information corresponding to testing of operations of the second device, and all or a portion of the return information received from the second device. One or more test parameters corresponding to the one or more function calls may be sent to the second device via one or more of the secure shell sessions, based on the read test input data. In some systems, the one or more function calls sent to the second device may enable at least one of the two or more layers of software to simulate a human machine interface module. The one or more function calls for testing the operations of the second device may be sent from at least one of the two or more layers of software in the second device via the D-bus to the Bluetooth module. The function calls may enable communicating via a Bluetooth radio to control operations in a third device communicatively coupled to the Bluetooth radio. The one or more secure shell sessions may comprise three secure shell sessions between the first device and the second device. The three secure shell sessions may be concurrently maintained in parallel by the automated testing tool to send commands to the second device and to monitor operations of the second device which may be responsive to the one or more function calls for testing operations of the second device. The return information may comprise information communicated to or from the Bluetooth module via the D-bus which may correspond to the one or more function calls. The automated testing tool may compare expected responses from the text in the read test input file to the received return information from the second device to determine the test verdict information. The first device and the second device may be communicatively coupled via a first mobile phone and a second mobile phone. Based on the read test input data, the automated testing tool may be operable to verify Bluetooth operations of the second device utilizing a call initiated, automatically by the automated testing tool, in the first mobile phone to the second mobile phone, or a call initiated, automatically by the automated testing tool, in the second mobile phone to the first mobile phone. The second device may comprise an electronic control unit (ECU) for a vehicle. The operations of the second device may include communication via the D-bus with the Bluetooth module based on one or more Bluetooth profiles. The operations may occur after receiving, by the second device, one or more of an audible voice command, a command in a wireless signal, a command in an optical signal or a command in a wire line signal.

Now, turning to the figures, FIG. 1 is a representative block diagram of one embodiment of a D-bus interprocess communication system. FIG. 1 includes a D-Bus communication system 100 which may comprise a D-Bus daemon process 110, an application process 142 and an application process 144. The D-bus daemon process 110 may comprise a connection instance 112 for communication with the application process 142 and a connection instance 114 for communication with the application process 144. The application process 142 may comprise a connection instance 132 for communication with the D-bus daemon process 110 via the connection instance 112. The application process 144 may comprise the connection instance 134 for communication with the daemon process 110 via the connection instance 114. A bidirectional message stream 122 may be communicated between the connection instance 112 and the connection instance 132 and a bidirectional message stream 124 may be communicated between the connection instance 114 and the connection instance 134.

The D-bus communication system 100 may comprise an interprocess communication (IPC) and/or remote procedure calling (RPC) mechanism for communication between processes running on the same host. The D-bus daemon process 110, the application process 142 and the application process 144 may all reside on the same computer system or processing platform. The D-bus communication system 100 may be available over a Linux or a Unix operating system, for example, and may communicate among processes utilizing Unix sockets or sockets in a Linux kernel. The D-bus communication system 100 may be used as a unified middleware layer underneath a higher layer environment, for example, a human machine interface (HMI) environment. The HMI software may be utilized for interaction between a human and a machine or equipment. In an exemplary embodiment, the application process 142 may comprise a human machine interface module and the application process 144 may comprise a Bluetooth module. These modules may be reside in an electronic control unit (ECU) of an in-vehicle information and/or entertainment system which may be operable to communicate with other devices, for example, with a mobile phone, via a Bluetooth wireless radio.

In operation, the D-bus daemon process 110 may comprise a computer program or set of instructions that may run as a background process. The D-Bus communication system 100 may comprise a logical bus over which the application processes communicate. For example, the D-bus daemon process 110 may be invoked at a time of execution and may be utilized as a session bus for exchanging data and/or commands between the application process 142 and the application process 144.

The D-bus daemon process 110 may communicate with other daemon processes. For example, some other daemon processes may implement logging facilities. The logging facilities may log activity performed by the application processes 142 and/or 144. Communication between the processes via the D-bus daemon process 110 may also be logged. Moreover, the other daemon processes may service incoming secure shell (SSH) sessions or connections. Secure Shell (SSH) may comprise a cryptographic protocol that may be utilized for secure data communication, remote shell services and/or command execution between two computers. SSH may connect via a secure channel over an insecure network or may connect a server and a client which may be running SSH server and SSH client programs.

The D-bus daemon process 110 may be utilized in any suitable computing environment, for example, in general purpose computers, automotive systems, aerospace, industrial automation and medical equipment. The D-bus daemon process 110 may be stored and/or executed in an electronic control unit (ECU) 202 (shown in FIG. 2). The ECU 202 may comprise an embedded system that may control one or more electrical systems or subsystems in a motor vehicle or a system that is coupled to the ECU 202. For example, the ECU 202 may interact with a display ECU to control a display screen and/or another corresponding control unit in a vehicular sub-system via a control area network. In another example, the ECU 202 may be operable to communicate with a mobile phone communicatively coupled to the ECU via a Bluetooth radio. In this regard, the ECU 202 may be part of a hands-free module that may be operable to receive audible voice commands from a user and/or to activate functions in the mobile phone via the Bluetooth connection such as initiating or receiving a phone call or streaming video images. The D-bus daemon process 110 may enable the process 142, which may perform functions with regard to the display and/or a user interaction, to communicate with the processes 144, which may handle mobile phone operations via the Bluetooth radio.

Although only two processes, 142 and 144, are shown in FIG. 1 communicating via the D-bus daemon process 110, there may be many more than two processes. The processes may perform or support different functions concurrently or in sequence, such as dialing a phone number in a mobile phone via a Bluetooth module, receiving audible voice commands or manually entered commands via a human machine interface (HMI) module, playing audio and/or video through a speaker and/or a display screen and displaying radio, navigation system or other telematics information. The D-Bus communication system 100 may be referred to as a D-bus.

Figure 2:
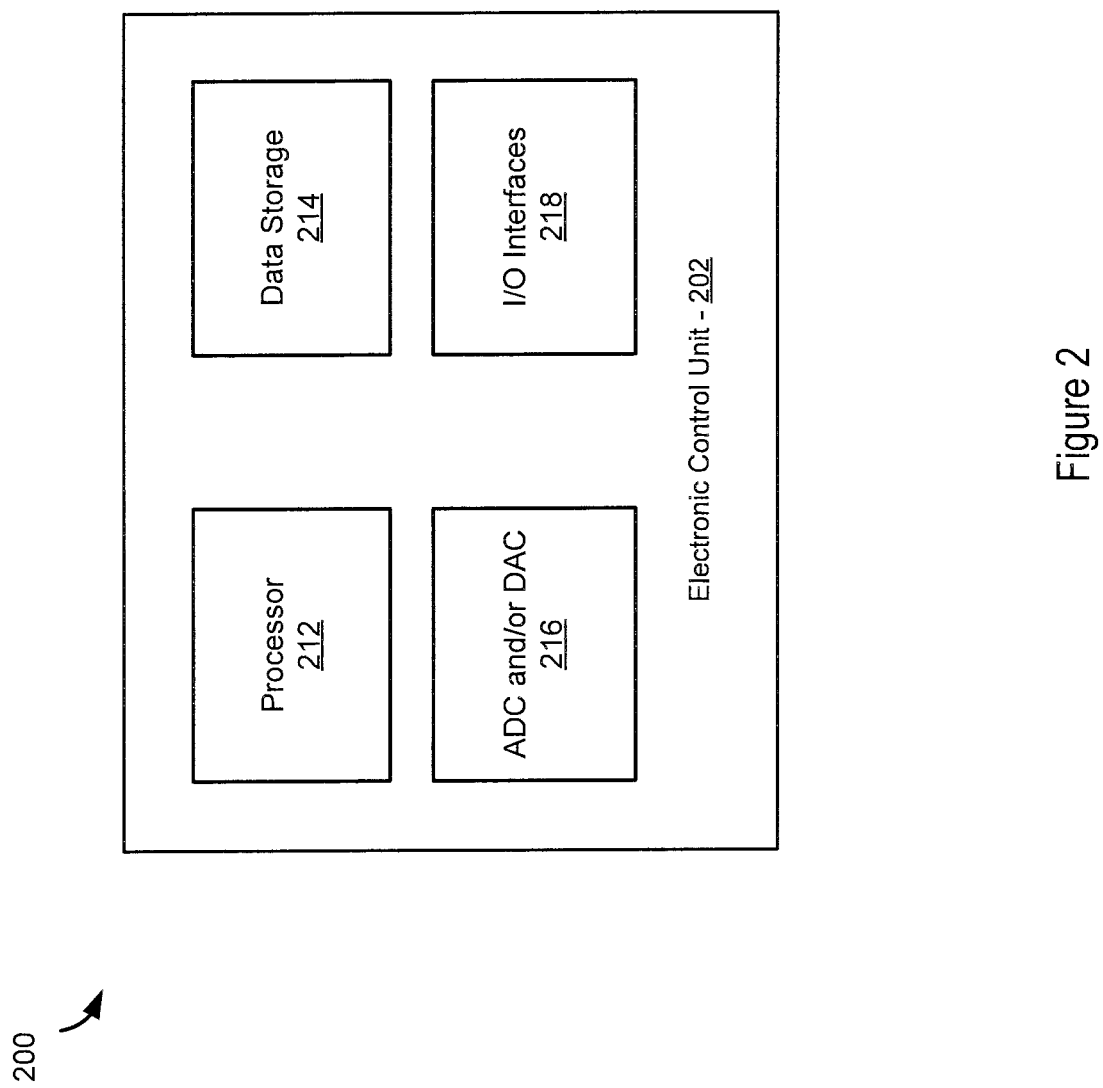
FIG. 2 is a representative block diagram of one embodiment of an electronic control unit which may provide communication between internal processes via a logical D-bus.

FIG. 2 is a representative block diagram of one embodiment of an electronic control unit which may provide communication between internal processes via a logical D-bus. Referring to FIG. 2, the system 200 may comprise the electronic control unit (ECU) 202. The ECU 202 may comprise a processor 212, a memory 214, input and/or output (I/O) interfaces 218 and analog to digital converter and/or a digital to analog converter (ADC/DAC) units 216.

The ECU device 202 may comprise a hands-free module and may be communicatively coupled to a control area network (CAN) bus. The ECU device 202 may communicate with other ECUs or modules via the CAN bus. U.S. patent application Ser. No. 13/829,677, filed on same date herewith, provides additional information regarding communication by the ECU device 202 via a control area network and is incorporated herein by reference, in its entirety. The ECU device 202 may be an embedded system that may control functions and/or devices of a larger system such as an in-vehicle system or other systems communicatively coupled to a CAN bus.

The processor 212 may include one or more processors and may comprise, for example, a microcontroller or digital signal processor and/or other types of circuits or logic. The processor 212 may be operable to execute one or more instructions stored in the memory 214. The memory 214 may comprise a computer readable medium such as random access memory (RAM) and/or read only memory (ROM) memory. The memory 214 may include a cache or random access memory for the processor 212. Alternatively or in addition, the memory 214 may be separate from the processor 212 such as system memory or other memory. The may store instructions and/or data that may be processed by the processor 212. For example the processor 212 and/or the memory 214 may implement the D-bus system 100 described with respect to FIG. 1 and may be operable to perform interprocess communication among software processes or applications run by the ECU 202.

The ECU 202 may be operable to perform analog to digital conversion and/or digital to analog conversion in the ADC/DAC units 216. For example, the ECU 202 may receive audible voice input via a microphone or may output audio via a speaker.

The I/O interfaces 218 may include a plurality of interfaces that may enable the ECU 202 to communicate with one or more external devices or systems. For example the I/O interfaces 218 may comprise one or more of a USB interface, an RS232 interface, an RJ45 or Ethernet interface, an audio input port that may be connected to a microphone, an audio output port that may be connected to a speaker or display system, a VGA and/or LVDS wiring that may be coupled to a display system, a serial connection to a CAN bus, or any other suitable wired or optical interfaces. Moreover, the I/O interfaces 218 may include one or more wireless network interfaces, for example, a Bluetooth radio interface or a wireless LAN interface. However, the system is not limited to any specific types of communication interfaces and may comprise any suitable communication interfaces.

In some exemplary systems, the processor 212, the memory 214, the I/O interfaces 218 and/or the ADC/DAC units 216 may reside on two or more separate integrated circuits. In other exemplary systems, a microcontroller on an integrated circuit in the ECU 202 may include one or more of the processor 212, memory 214, and one or more peripherals such as the I/O interfaces 218 and ADC/DAC units 216. Two or more of the processor 212, the memory 214, the I/O interfaces 218 and/or the ADC/DAC units 216 may be communicatively coupled in the ECU 202.

In operation, the ECU 202 may control, or operate as part of, one or more information and/or entertainment systems in an automobile system. The ECU 202 may comprise a human machine interface and may be operable to accept commands from a user, such as audible voice commands input via a microphone or manually input commands from a display screen or mechanical buttons. The ECU 202 may communicate information to a user by outputting information on the display screen and/or to a speaker system and may provide a menu or indicate a choice of actions that a user may control by inputting commands to the ECU 202. The ECU 202 may initiate or control functions in other systems or subsystems of the vehicle or other systems or devices that may be communicatively coupled to the ECU 202. The system control may be based on user input commands. Exemplary systems or subsystems may include a radio, a navigation system, a mobile phone, an emergency warning system, wireless safety communication, automatic driving assistance or other telematics. In some embodiments, the ECU 202 may comprise a hands-free module that may be operable to communicate via a CAN bus with other ECUs in a vehicle, however, the system is not limited in this regard.

The ECU 202 may be communicatively coupled via the I/O interfaces 218, to, for example, to a mobile phone, a display screen, a CAN bus, a microphone system, a speaker system or other types of sensors. In instances when the ECU 202 receives a command via a human machine interface, for example, which may indicate an action to be taken or may trigger activation of a system or subsystem, the ECU 202 may communicate via one or more of the interfaces 218, with the system or subsystem, based on the received command. For example, ECU 202 may be communicatively coupled with a mobile phone via a Bluetooth radio interface in the I/O interfaces 218 (shown in FIG. 3). A user may provide a voice command to make a phone call via a microphone audio input in the I/O interfaces 218, for example. The ECU 202 may receive and/or process the command utilizing a human machine interface (HMI) software process or module. The HMI software module may communicate the command information via the D-Bus communication system 100 to a Bluetooth module. The Bluetooth module may be operable to communicate information to the mobile phone via the Bluetooth radio interface connection to initiate a phone call by the mobile phone.

Similarly, the ECU 202 may receive commands via the HMI module for other systems or subsystems and the HMI module may communicate with them via the D-Bus communication system 100. For example, communication over the D-Bus communication system 100 may enable control of a display screen, a radio, a navigation system, a mobile phone, an emergency warning system, wireless safety communication, automatic driving assistance or other telematics.

Figure 3:
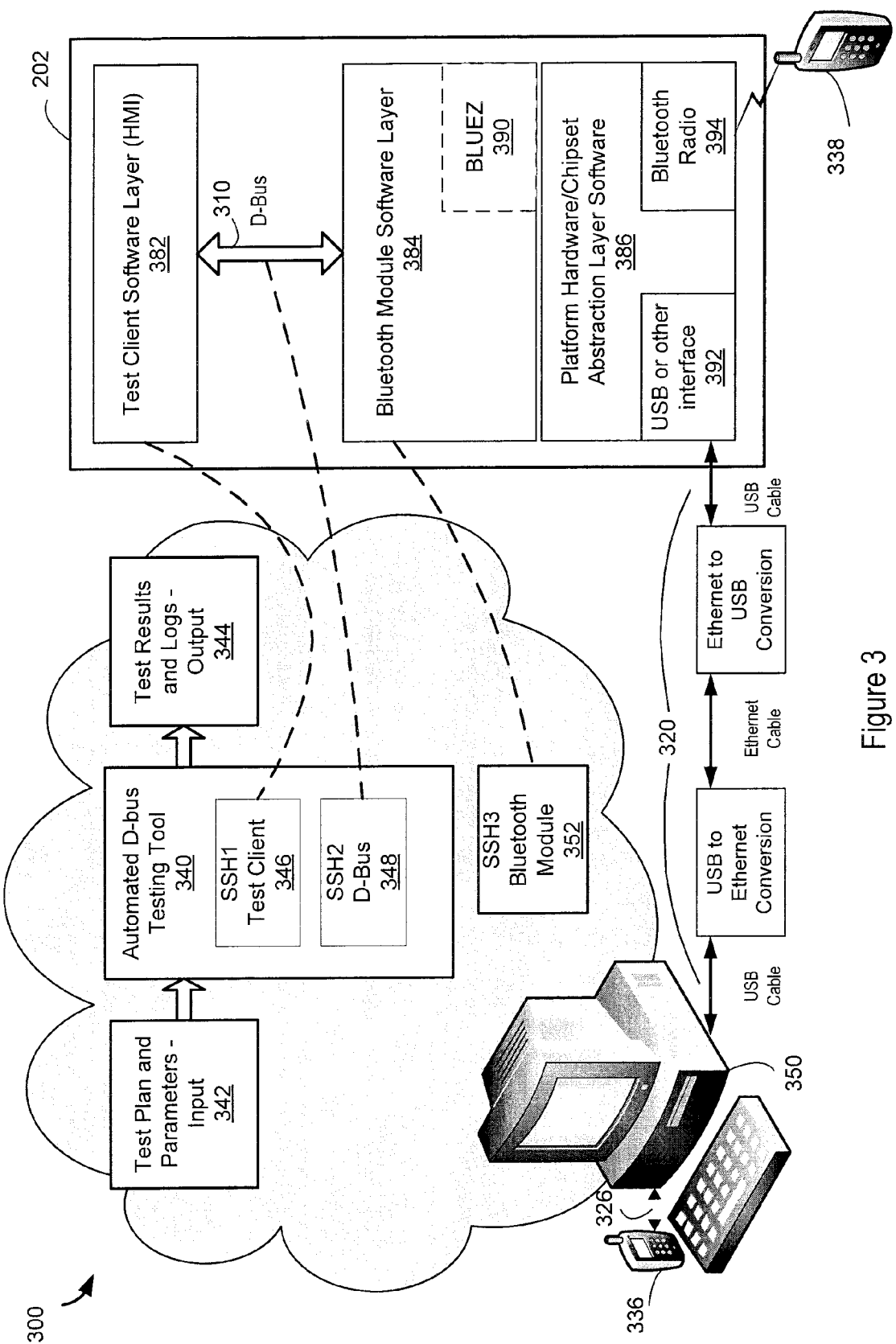
FIG. 3 is a representative diagram of one embodiment of a test set-up for automated testing of D-bus communication for Bluetooth profiles.

FIG. 3 is a representative diagram of one embodiment of a test set-up for automated testing of D-bus communication for Bluetooth profiles. Referring to FIG. 3, a testing system 300 may include a test computer 350, an electronic control unit (ECU) 202, cable and connector system 320, a test mobile phone 336, a mobile phone 338 and a cable 326. The ECU 202 may comprise a system software stack including a platform hardware abstraction layer 386, a Bluetooth module 384 a test client 382 and a D-bus 310. In addition, software resident on the test computer 350 may include an automated D-bus test tool 340, a test client secure shell (SSH1) 346, a D-bus secure shell (SSH2) 348, a Bluetooth module secure shell (SSH3) 352, a test plan and test parameter input file 342 and a test result and log output file 344.

The ECU 202 is described with respect to FIGS. 1 and 2. The D-Bus 310 may be similar or substantially the same as the D-Bus system 100 described with respect to FIGS. 1 and 2. In an exemplary embodiment, the ECU 202 may be an electronic control unit of a hands-free system that may be utilized in an automobile; however, the system is not limited in this regard. The Bluetooth radio 394 may comprise software, firmware and/or hardware that may be operable to establish a wireless connection with another device, for example, the mobile phone 338, utilizing Bluetooth wireless technology.

In instances when the ECU 202 is installed in a vehicle system as part of a hands-free information and/or entertainment unit, it may receive audible voice commands from a user to perform specified actions, such as to change a radio station, activate a navigation system, find a driving route or make a phone call. As a result, the ECU 202 may communicate with a display to change an image presented on the display screen and to inform a user of actions being taken in the system or to provide menu selections for user input. The hands-free module may communicate with other ECUs via a CAN bus to enable operations requested by the user.

While the functionality of the ECU 202 is being tested, the ECU may not be connected to or may not communicate with a display unit and may not utilize a human machine interface (HMI) layer and instead may utilize a test client 382 software layer to simulate the HMI layer for testing purposes. However, in instances when the ECU 202 is installed and operational as part of a hands-free module in a vehicle, it may be operable to receive user commands such as audio input or other types of input data via the I/O interfaces 218. The commands may be processed by an HMI software layer in the ECU 202. The HMI software layer may enable user interaction with the hands-free module via a user interface implemented via a display screen, a speaker, a microphone or any other suitable input and/or output mechanisms. The HMI software layer may communicate user command information to the Bluetooth module 384 via the D-bus 310. The Bluetooth module 384 may be operable to communicate via the Bluetooth radio 394 to initiate or receive a phone call on the mobile phone 338. The ECU 202 may control operation of the mobile phone 338 via the Bluetooth radio 394 based on the user commands. The ECU 202 may signal the mobile phone 338 to initiate a phone call or send a text message to a specified phone number, for example, based on the user commands. Moreover, the mobile phone 338 may receive a phone call or message from another phone and may communicate information regarding the received phone call to the ECU 202 via the Bluetooth radio 394. Information that is displayed on a screen or sent to a speaker in the mobile phone 338 may be communicated via the Bluetooth radio 394 to the Bluetooth module 384 in the software stack and to the HMI layer and may be displayed on the hands-free module display screen to provide information to the user or for user interaction. Also, action requests that may be input to the hands-free module or ECU 202 for the mobile phone 338, such as for making a call, playing or streaming audio and/or video or texting, for example, may be sent to the mobile phone 338 by inputting a voice command to the hands-free module ECU 202 via a microphone.

The ECU 202 shown in FIG. 3 may be tested outside of a vehicular system, for example, in a lab environment or a manufacturing test environment such as the testing system 300. Bluetooth profiles of the Bluetooth module 384 in the ECU 202 may be tested without use of an actual display unit, microphone or human machine interface (HMI) layer software. For example, the HMI layer software may be simulated by or replaced by the test client 382 for the purpose of testing the middle and lower layer software and Bluetooth functionality. The test client 382 may send user commands to the Bluetooth module 384 via the D-Bus 310 and/or may receive responses or other information from the Bluetooth module 384, for example, when a phone call comes into the mobile phone 338. In this manner, the functionality of software and/or platform hardware of an ECU 202 may be tested. The test client 382 may comprise a software module that may interact with the ECU 202 software stack including the D-bus 310, the Bluetooth module 384 and/or the platform hardware abstraction layer 386. The test client 382 may simulate an HMI software layer. The test client 382 may be utilized to test the functions performed by the Bluetooth module 384 and other ECU 202 platform hardware and/or software utilized in communicating with, for example, the mobile phone 338. In this regard, the platform hardware abstraction layer 386 may cause platform hardware and/or a chip set to communicate with an external device, such as the mobile phone 338 utilizing the Bluetooth radio 394. The test client 382 may send and receive signals and/or data via the D-bus 310 that would normally be communicated by an HMI software layer to control a hands-free module in an information and/or entertainment system. The test client 382, D-bus 310, Bluetooth module 384 and hardware abstraction layer 386 may comprise software that may be executed in the processor 212, for example.

The Bluetooth module 384 may be a software implementation built on top of an information and/or entertainment and/or Navigation platform. The Bluetooth module 384 may be a middle layer component of ECU 202 system software stack. For example, the Bluetooth module 384 may comprise middle layer software between the test client 382 and the hardware abstraction layer 386. In some systems, the Bluetooth module 384 may be built using open source packages such as BlueZ 390 or other packages, for example, Ofono or Obex. The BlueZ 390 module may include a Bluetooth stack for Linux and/or low level utilities and/or firmware packages. The BlueZ stack may support core Bluetooth protocols and layers, hardware abstraction, a socket interface and/or device and service level security support. The Bluetooth module 384 including the BlueZ module 390 may be referred to as the Bluetooth module 384.

The Bluetooth module 384 may communicate with the test client 382 via the D-bus 310 and/or socket communication. The Bluetooth module 384 may comprise a plurality of Bluetooth profiles. A Bluetooth profile may include specifications regarding an aspect of Bluetooth-based wireless communication between devices. The ECU 202 may be compatible with a subset of Bluetooth profiles which may be utilized for desired Bluetooth services. The way in which the ECU 202 uses Bluetooth technology may depend on which profiles it supports. The profiles may provide standards which manufacturers may follow to enable the ECU 202 communicate with other devices using Bluetooth. The ECU 202 may use many different Bluetooth profiles, for example, Bluetooth profiles for communicating with a mobile phone using a hands-free device, general access between two Bluetooth devices, streaming audio, video or transferring images to a phone, sending messages, sending data to a printer and communicating with a headset. However, the system is not limited to any specific type of profiles and any suitable Bluetooth profiles may be utilized.

In instances when the ECU 202 receives a command, or when the test client 382 simulates an HMI layer processing a user command, the test client 382 may send parameters and/or may call or invoke application interfaces (API) in the Bluetooth module 384 to perform a corresponding action such as making a call, streaming video or sending an SMS message to or from the mobile phone 338 via the Bluetooth radio 394. In some instances, a sequence of APIs may be called to perform the action. An API call may be referred to as a function call. The test client 384 may call one or more APIs in the Bluetooth module 384 via the D-bus 310 and may pass one or more parameters to the APIs. The parameters may comprise information that the Bluetooth radio 394 and/or the mobile phone 338 may use to perform the requested actions, for example, parameters may include a phone number to call, a communication rate, or a file name. The APIs may send a return value back to the test client 382 via the D-Bus 310, in response to an API call. The return value may be in the form of a stack structure, for example. In addition, in instances when the mobile phone 338 receives a call from another phone, such as the test phone 336, the Bluetooth module 384 may invoke a number of APIs and may send corresponding information to the test client 382 via the D-Bus 310.

Figure 4:
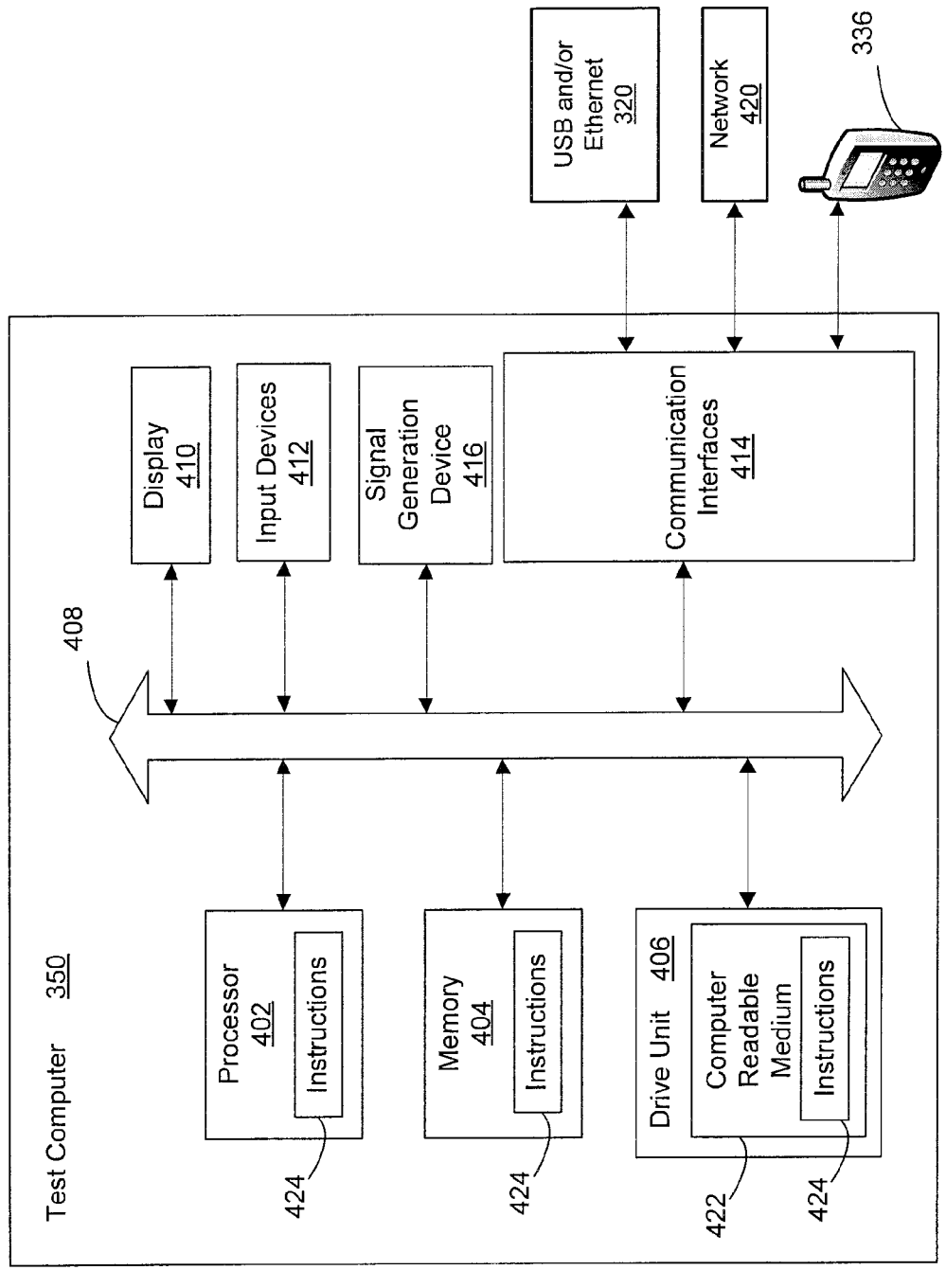
FIG. 4 is a representative block diagram of one embodiment of a test computer that hosts a D-bus automated testing tool.

The test computer 350 is described with respect to FIG. 4 and may be, for example, in one embodiment a general purpose computer, or in another embodiment a specially programmed piece of test equipment. The test computer 350 may be referred to as the computer system 350. The test computer 350 may be communicatively coupled to the ECU 202 via a wireless or wire line connection. For example, the cable and connector system 320 may couple the test computer 350 to the ECU 202 utilizing an Ethernet connection. In some systems, a USB connector cable may be attached to the test computer 350 and the cabling system may be converted to Ethernet and/or back to USB before attaching to the ECU 202. However, the system is not limited to any specific type of cabling or connections between the test computer 350 and the ECU 202 (shown in FIG. 3). The test computer 350 may be operable to communicate with the ECU 202 via one or more secure shells SSH1 346, SSH2 348 and SSH3 352 over the cable and connector system 320, or via any suitable wireless connection, such as IEEE 802.11.

The test computer 350 may be operable to store and execute the automated D-bus testing tool 340 to test operations of the ECU 202 using the test client 382. The automated D-bus testing tool 340 may be defined using LabVIEW. The automated D-bus testing tool 340 may control the test system 300 environment by automatically calling functions or a sequence of user actions defined in the test client 382 and verifying responses from the Bluetooth module 384. The automated D-bus test tool 340 may send information such as function calls and/or parameters to the test client 382 that may enable the test client 382 to simulate a human machine interface software layer. The D-bus automated testing tool 340 may receive and parse a D-Bus monitor log and may verify commands or responses sent from the Bluetooth module 384 to determine a test result verdict. The automated D-bus testing tool 340 may accept test input in the test plan and test parameter input file 342 which may be an Excel file and may output a detailed test report and/or logs of D-bus communication in the test result and log output file 344 which may be an Excel file, for example. However, the system is not limited with regard to a type or format of the input and output files. The test plan and test parameter input file 342 may include test steps, D-bus commands and corresponding expected return values. The test result and log output file 344 may include the expected results, the logged commands and/or return values, pass and/or fail verdicts and/or detailed logs of D-bus 310 communication.

Secure shells (SSH) may be utilized to connect the automated D-bus testing tool 340 to the ECU 202 platform hardware via the cable and connector system 320. In some exemplary systems, a PuTTY terminal emulator may be utilized to create the SSH1 346, SSH2 348 and/or SSH3 352 secure shell sessions to the ECU 202 platform hardware from a Windows environment over Ethernet. The D-bus automated testing tool may launch the PuTTY tool to establish the sessions. At least two, or all three of the secure shell sessions may be opened in parallel mode, for example, one for interacting with test client and another to monitor the D-bus session. The test client SSH1 346 login may run the test client module 382, which may interact with the Bluetooth module 384 over D-Bus 310. The automated D-bus test tool 340 may create and control SSH1 346 to call functions defined in the test client 382 based on a sequence of function and parameters defined in the test plan and test parameter input file 342. As a result the test client 382 may call the functions or APIs in the Bluetooth module 384. Each function or API under test in the Bluetooth module 384 may have a corresponding identifier (ID) and/or one or more parameters included in the test plan and test parameter input file 342. The automated D-bus testing tool 340 may send a function ID and pass a number of corresponding parameters to the test client 382 in the ECU 202 via the SSH1 346. The test client 382 may send the parameters and/or call one or more APIs in the Bluetooth module 384 via the D-bus 310 and a corresponding function may execute in the ECU 202. The Bluetooth module 384 may return a value or a function results back to the test client 382 via the D-bus 310.

The D-bus SSH2 348 login may run a D-Bus 310 monitor to log commands and/or responses communicated between the Bluetooth module 384 and the test client 382 and to send the log information back to the test computer 350. The automated D-bus test tool may create the D-bus SSH2 and may parse the D-Bus monitor log captured from the D-bus SSH2 348 session to determine the test verdicts. After the tests defined in the test plan and test parameter input file 342 are run in the ECU 202 and the log information is returned and processed by the test computer 350, a report may be generated in the test result and log output file 344 of the test computer 350.

In some exemplary systems, the Bluetooth module 384 secure shell SSH3 352 may be created manually so that the Bluetooth module 384 may be initialized and launched in the SSH3 352 session. In some systems, this may be done prior to running the automated D-bus testing tool 340 to initialize the Bluetooth radio 394, or it may be done by the automated D-bus test tool 340.

The test computer 350 may be communicatively coupled with the test mobile phone 336. In some systems, the test computer 350 may communicate with the test mobile phone 336 via an attached cable 326 using AT commands or may use a wireless connection. The automated D-Bus testing tool 340 may be operable to initiate a call by the test mobile phone 336 to the mobile phone 338 and may be operable to answer or receive calls in the test mobile phone 336 from the mobile phone 338. The automated D-bus testing tool 340 may communicate using AT commands to the test mobile phone 336 to make a call to the mobile phone 338 and/or to answer a phone call and/or retrieve information that may verify that a phone call or message was successfully received from the mobile phone 338. The automated D-bus testing tool 340 may utilize the communication to and/or from the test phone 336 to determine the success and/or failure verdict for calls made by the test client 382 via the mobile phone 338 and/or received by the test client via the mobile phone 338.

The automated D-bus testing tool 340 may generate test results data in the test results and log output file 344. The test results may be based on information communicated over the D-bus 310 as a result of API calls in the Bluetooth module 384 and/or return values captured in the D-bus logs via the SSH2 348. The automated D-bus testing tool 340 may utilize the D-bus log information to validate that Bluetooth module 384 executed the APIs successfully and returned the appropriate values. For example, the automated D-bus testing tool 340 may extract a return value for a specified API or function ID, and compare it to an expected return value based on information received in a test plan and test parameter input file 342. In this manner, Bluetooth profiles may be tested. Furthermore, the automated D-bus testing tool 340 may generate test results data in the test results and log output file 344 based on data communicated via the SSH1 346, the SSH2 348 and/or the SSH3 352.

An exemplary test result and log output file 344 may comprise a Microsoft Excel file. The test result and log output file 344 may include test client logs, Bluetooth function calls, input parameters, expected return values, observed return values, verdicts such as test pass or fail information and/or remarks. Moreover, the test result and log output file 344 may include detailed logs of the communications over the D-bus including, for example, API calls, returned values, commands and other interprocess communication within the ECU 202.

In operation, the automated D-base testing tool 340 may automate steps to test Bluetooth profiles in the ECU 202. The ECU 202 may comprise all or a portion of an information and/or entertainment system platform. The SSH3 352 may be established with the ECU 202 via the cable and connector system 320 to communicate with the Bluetooth module 384 and initialize the Bluetooth radio 394. The SSH3 352 session may be established by the automated D-bus testing module 340, or in some systems, may be established outside of the automated D-base testing tool 340. The automated D-bus testing tool 340 may be operable to establish the SSH1 346 with the test client 382 and the SSH2 348 with the D-bus 310. The SSH1 346, the SSH2 348 and the SSH3 352 sessions may operate in parallel and/or concurrently. The automated D-bus testing tool 340 may monitor one or more of the three secure shell sessions and/or may send communication or commands to the ECU 202 via the three secure shell sessions of SSH1 346, SSH2 348 and SSH3 352, in parallel and/or concurrently. The automated D-bus testing tool 340 may receive and read test input and/or test parameters from the test plan and test parameter input file 342. The test plan and test parameter input file 342 may include one or more actions that may be performed by the Bluetooth module 384 and/or the Bluetooth radio 394, for example, in accordance with one or more Bluetooth profiles. The test plan and test parameter input file 342 may include expected test results for one or more of the actions included in the test plan. The automated D-bus testing tool 340 may communicate the actions to the test client 382 via the SSH1 346 and the cable and connector system 320, for example. In some systems the automated D-bus test tool 340 may send information such as function calls and/or parameters to the test client 382 that may enable the test client 382 to simulate a human machine interface software layer. The test client 382 may call one or more APIs or function IDs in the Bluetooth module 384 and/or the BlueZ module 390 and may pass one or more parameters corresponding with the API or function calls. The Bluetooth module 384 and/or the BlueZ module 390 may enable execution of the functions in the Bluetooth stack, the Bluetooth radio 394, the hardware abstraction layer 386 and/or in the ECU 202 platform hardware and/or chipset, and may send results back to the test client 382 via the D-Bus 310. The results may comprise a return value in the form of a stack structure. The SSH2 348 may monitor the D-bus 310 to log the results back to the automated D-bus testing module 340. The automated D-bus testing tool 340 may be operable to verify the results, for example, based on the stack structure, by comparing observed values with the expected values and may determine a pass or fail verdict for each test. In this manner, the automated D-bus testing tool 340 may determine whether the APIs and/or functions in the Bluetooth module 384 and/or the BlueZ module 390 executed correctly utilizing the parameters passed to it. The test results may be written to the test results and logs output file 344 along with logs of activity and/or communication on: the D-Bus 310 via the SSH2 348, the test client 382 via the SSH1 346 and/or the Bluetooth module 384 via the SSH3 352.

The automated D-bus testing tool 340 may be operable to request that mobile phone calls and/or messages be made from the mobile phone 338 to the test phone 336, by passing parameters and invoking functions defined in the test client 382. The test client 382 may then call the appropriate APIs and pass parameters to the Bluetooth module 384 via the D-bus 310. The Bluetooth module 384 may cause the Bluetooth radio 394 to communicate the call request and parameters, for example, a phone number, to the mobile phone 338. The mobile phone 338 may receive the request and phone number and may call the test phone 336. In instances when the mobile phone 338 makes a phone call to the test phone 336, the automated D-bus testing tool 340 may communicate with the test phone 336 utilizing AT commands to answer the phone call from the mobile phone 338 and/or determine activity that may occur between the two phones. The test results and logs output file 344 may include test results based on the calls attempted and/or received at the test phone 336 and AT command communication from the test phone 336 and/or information received via the secure shells. Moreover, the mobile phone 338 may be instructed by the Bluetooth module 384 to perform other functions, for example, that may be supported by Bluetooth profiles, such as sending SMS messages, transferring an image or a file and streaming video and/or audio.

Furthermore, the automated D-bus testing tool 340 may utilize AT commands to instruct the test phone 336 to call the mobile phone 338. In instances when the mobile phone 338 receives a call, it may communicate with the Bluetooth module 384 via the Bluetooth radio 394. The Bluetooth module 384 and/or the BlueZ module 390 may invoke one or more APIs and may send results of the API calls to the test client 382 via the D-bus 310. The SSH1 346, SSH2 348 and/or SSH3 352 may capture the return communications and communicate the return information to the automated D-bus testing tool 340. The test results and logs output file 344 may include test results based on the captured return information from the mobile phone 338. The return communications may include the phone number of the test phone 336 that placed the call to the mobile phone 338. In instances when the ECU 202 is communicatively coupled with a display unit, for example, in a hands-free information and/or entertainment system, the return information may be communicated to HMI layer software and displayed on a screen for a user. For example, the phone number of the test phone 336 from the phone call coming into the mobile phone 338 may be displayed on the screen along with options to answer the call or end the call, for example.

FIG. 4 is a representative block diagram of one embodiment of a test computer system that may host the D-bus testing tool described with respect to FIGS. 1, 2 and 3. The computer system 350 may comprise automated D-bus testing tool 340 logic, which, when executed, may cause the computer system 350 to perform any of the logic and/or steps disclosed herein. The computer system 350 may operate as a standalone device or may be connected, for example, using a network or other connection, to other computer systems or peripheral devices. The automated D-bus testing tool 340 may be implemented through hardware, software or firmware, or any combination thereof. Alternative software implementations may include, but are not limited to, distributed processing or component/object distributed processing, parallel processing, or virtual machine processing may also be constructed to implement the tools described herein.

In a networked deployment, the computer system 350 may operate in the capacity of a server or as a client user computer in a server-client user network environment, or as a peer computer system in a peer-to-peer (or distributed) network environment. The computer system 350 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing the automated D-bus testing tool 340 logic that specifies actions to be taken by that machine. The computer system 350 may comprise electronic devices that provide voice, video or data communication. The system implementation may be a single computer system 350, or may include any collection of systems or sub-systems that individually or jointly execute a set, or multiple sets, of instructions to perform any of the processing for the automated D-bus testing tool 340 and communications noted above.

The computer system 350 may include a processor 402, for example, a central processing unit (CPU), a graphics processing unit (GPU), or both. A processor may be implemented as a controller, microprocessor, digital signal processor, microcontroller, application specific integrated circuit (ASIC), discrete logic, or a combination of other types of circuits or logic. Moreover, the computer system 350 may include a memory 404 that can communicate via a bus 408. The memory 404 may be a main memory, a static memory, or a dynamic memory. The memory 404 may include, but may not be limited to internal and/or external computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 404 may include a cache or random access memory for the processor 402. Alternatively or in addition, the memory 404 may be separate from the processor 402, such as a cache memory of a processor, the system memory, or other memory.

The computer system 350 may further include a display 410, such as a liquid crystal display (LCD), an organic light emitting diode (OLED), a flat panel display, a solid state display, or a cathode ray tube (CRT). Additionally, the computer system 350 may include an input device 412, such as a keyboard and/or a cursor control device such as a mouse or any other suitable input device. The computer system 350 may also include a disk drive unit 406, a signal generation device 416, such as a speaker or remote control, and a one or more interfaces devices 414. The one or more interface devices 414 may include any suitable type of interface for wireless, wire line or optical communication between the computer system 350 and another device or network such as the ECU 202. For example, the computer system 350 may be communicatively coupled with the mobile phone 336, the ECU 202 and/or a network via the one or more interface devices 414. The computer system 350 may be communicatively coupled via an Ethernet and/or USB connection via the cable and connector system 320. The computer system 350 may be operable to communicate and/or gain access to the ECU 202 via one or more secure shells SSH1 346, SSH2 348 and SSH3 352 via the cable and connector system 320. The computer system 350 may be operable to communicate utilizing AT commands with the mobile phone 336 via the cable or wireless connection 326.

The disk drive unit 406 may include a computer-readable medium 422 in which one or more sets of instructions 424, for example, software, may be embedded. Further, the instructions 424 may embody one or more of the methods and/or logic as described herein for the automated D-bus testing tool 340. In a particular embodiment, the instructions 424 may reside completely, or at least partially, within the main memory or static memory 404, and/or within the processor 402 during execution by the computer system 350. The memory 404 and/or the processor 402 also may include computer-readable media.

In general, the automated D-bus testing tool 340 logic and processing described above may be encoded and/or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software.

The system may include additional or different logic and may be implemented in many different ways. Memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

Figure 5:
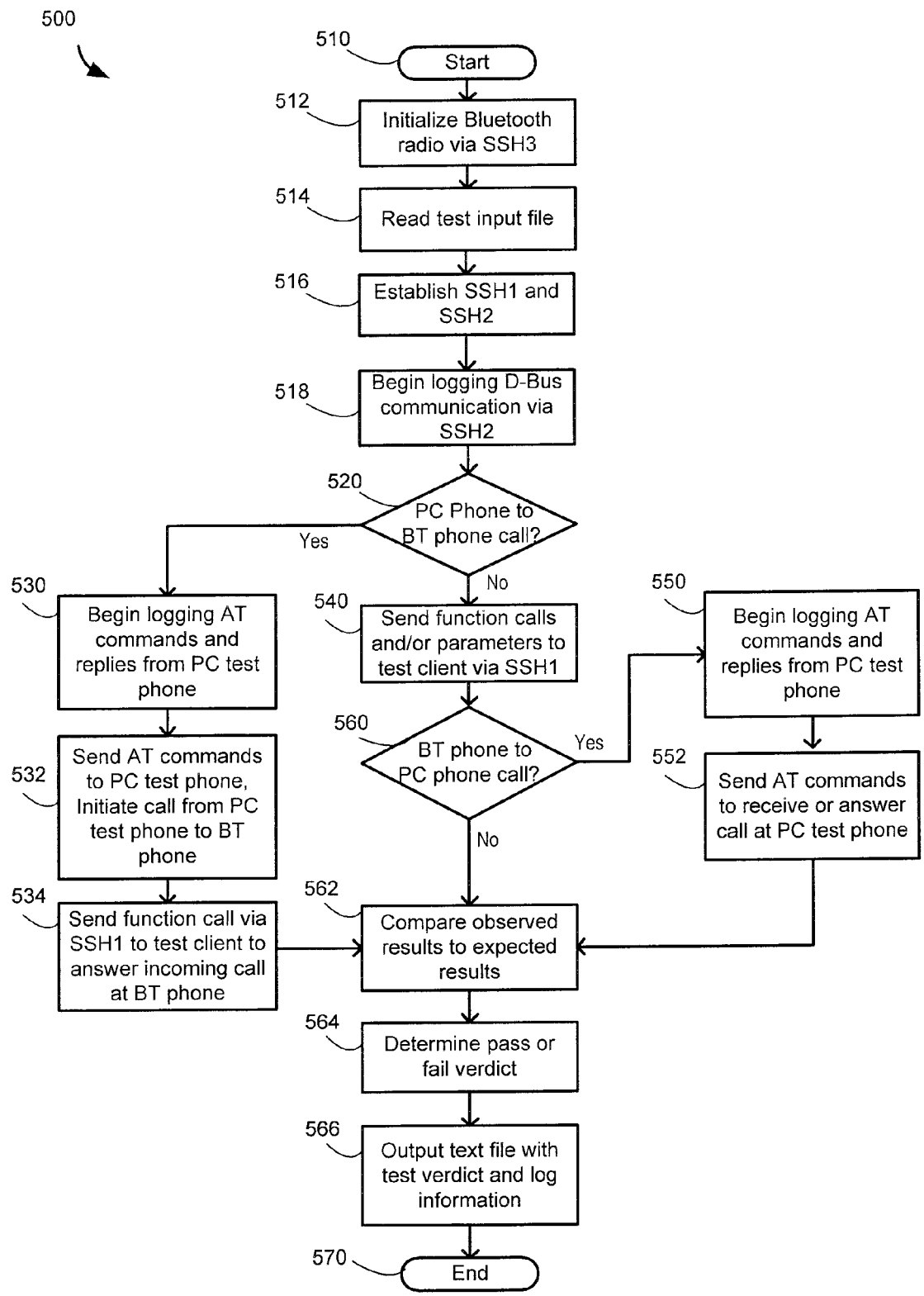
FIG. 5 is a flow chart representing exemplary steps for automated testing of Bluetooth profiles utilizing D-bus data logging.

FIG. 5 is a flow chart representing exemplary steps for automated testing of Bluetooth profiles utilizing D-bus data logging. Referring to FIG. 5, the exemplary steps may begin at start step 510. In step 512, the secure shell SSH3 352 may be established between the test computer 350 and the ECU 202 platform via the cable and connector system 320 to initialize the Bluetooth radio 394 (see FIG. 3). In step 514, the automated D-bus testing tool 340 may read test scenarios and/or test parameters from the test plan and parameters input file 342. In step 516, the automated testing tool 340 may establish the SSH1 346 to the test client 382 via the cable and connector system 320 to enable communication between the automated testing tool 340 and the test client 382. Also, the automated D-bus testing tool 340 may establish the SSH2 348 that may enable communication between the automated testing tool 340 and the D-bus 310. In step 518, the automated testing tool 340 may begin logging D-bus 310 communication to monitor interprocess communication between two or more of the test client 382, the Bluetooth module 384 and the hardware abstraction layer 386.

In step 520, in instances when the automated D-bus testing tool 340 is not initiating a phone call at the test phone 336, the exemplary steps may proceed to step 540. At step 540, the automated testing tool 340 may send function calls and/or parameters to the test client 382 via the SSH1 346. In this regard, the test client 382 may send the function calls or API calls and/or parameters to the Bluetooth module 384 and/or the BlueZ module 390 that may perform specified actions including the Bluetooth radio 394 to test one or more Bluetooth profiles.

In step 560, in instances when the automated D-bus testing tool 340 may not enable the test phone 336 to receive a phone call from the mobile phone 338, the exemplary steps may proceed to step 562. In step 562, the automated D-bus testing tool 340 may compare observed values from the D-bus received via the SSH2 348 or from the test phone 336, to expected values read from the test plan and parameters file 342. In step 564, the automated D-bus testing tool 340 may determine whether the Bluetooth module 384 communicated appropriate data via the D-bus relative to the function calls that were sent by the automated D-bus testing tool 340 and may determine one or more test pass or fail verdicts. Moreover, the automated testing tool 340 may determine pass or fail verdicts based on data received from the test phone 336. In step 566, the automated voice based testing tool 340 may write the one or more test pass or fail verdicts, the logged D-bus communication and/or logged AT commands and replies, to the test results and logs output file 344. The exemplary steps may end at step 570.

In step 520, in instances when the automated D-bus testing tool 340 may be initiating a phone call at the test phone 336 to call the mobile phone 338, the exemplary steps may proceed to step 530. At step 530, the automated D-bus testing tool 340 may begin logging AT commands and replies from the test phone 336. At step 532, the automated D-bus testing tool 340 may send AT commands to the test phone 336 to initiate a call from the test phone 336, to the mobile phone 338 which may be communicatively coupled with the ECU 202 via the Bluetooth radio 394. At step 534, the automated D-bus testing tool 340 may send function calls via the SSH 1 346 to the test client 382 to answer the phone call from the test phone 336 to the mobile phone 338. The test client 382 may call one or more APIs in the Bluetooth module 384 and/or BlueZ module 390 which may enable communication with the mobile phone 338 via the Bluetooth radio 394 to receive and/or answer the incoming call at the mobile phone 338. The exemplary steps may proceed to step 562.

In step 560, in instances when the automated D-bus testing tool 340 may be receiving a phone call at the test phone 336 from the mobile phone 338, the exemplary steps may proceed to step 550. In step 550, the automated D-bus testing tool 340 may begin logging AT commands and replies from the test phone 336. At step 552, the automated D-bus testing tool 340 may send AT commands to the test phone 336 to receive or answer the call from the mobile phone 338 which may be communicatively coupled with the ECU 202 via the Bluetooth radio 394. The exemplary steps may proceed to step 562.

We claim:

1. A method for automated testing of Bluetooth operations of a Bluetooth module in an electronic control unit (ECU) device for a motor vehicle in communication with a mobile communication device, the method comprising:
   in an automated testing tool hosted by a first device:
      reading test input data from text in an input file on said first device for testing Bluetooth operations of an ECU second device to be used in a motor vehicle wherein:
         said Bluetooth operations of said ECU second device controls Bluetooth communication between said ECU second device and a mobile communication third device, said mobile communication third device being located within a distance from said ECU second device for making a Bluetooth radio connection;
         said ECU second device comprises two or more layers of software, said two or more layers of software including a Bluetooth module and a test client that tests said Bluetooth module within said ECU second device,
         said Bluetooth module and said test client communicate within said ECU second device via a daemon bus (D-bus),
         said Bluetooth module further communicates via a Bluetooth radio within said ECU second device to said mobile communication third device, in order to control operations of said mobile communication third device;
      establishing one or more secure shell sessions for data communication between said first device and said ECU second device;
      calling functions defined in said test client of said ECU second device utilizing a first secure shell session;
      monitoring communication on said D-bus utilizing a second secure shell;

sending one or more function calls for said testing Bluetooth operations of said ECU second device to said ECU second device via aid first secure shell session, based on said read test input data, wherein said one or more functional calls initiates communication between said Bluetooth module of said ECU second device and said mobile communication third device via said Bluetooth radio;

receiving by said automated testing tool hosted by said first device, return information from said ECU second device via said second secure shell session, wherein said return information corresponds to said Bluetooth operations of said ECU second device responsive to said one or more function calls for said testing Bluetooth operations of said ECU second device;

comparing expected responses from said text in said read test input file to said return information from said ECU second device to validate execution of application program interfaces called by said Bluetooth module of said ECU second device responsive to said function calls;

determining test pass and test fail verdict information based on said comparison of said expected responses to said return information from said ECU second device; and writing text in an output file, said text comprising said test pass and said test fail verdict information based on said comparison of said expected responses to said return information from said ECU second device.

2. The method of claim 1, further comprising sending one or more test parameters corresponding to said one or more function calls to said ECU device via said first secure shell sessions, based on said read test input data.

3. The method of claim 1, wherein said one or more function calls sent to said ECU device enable said test client of said two or more layers of software to simulate a human machine interface module.

4. The method of claim 1, wherein said one or more function calls for said testing said Bluetooth operations of said ECU device are sent from said test client of said two or more layers of software in said ECU device via said D-bus to said Bluetooth module for communicating via said Bluetooth radio in said ECU device to said first mobile communication device to control said operations in said first mobile communication device communicatively coupled to said Bluetooth radio.

5. The method of claim 1, further comprising initializing said Bluetooth radio in said ECU via a third secure shell session wherein said first, second and third secure shell sessions are concurrently maintained in parallel by said automated testing tool to send commands to said ECU device and to monitor said operations of said ECU device, responsive to said one or more function calls for said testing Bluetooth operations of said ECU device.

6. The method of claim 1, wherein said return information comprises information communicated to or from said Bluetooth module via said D-bus, corresponding to said one or more function calls for said testing Bluetooth operations of said ECU device.

7. The method of claim 1 further comprising, in said automated testing tool, comparing expected responses from said text in said read test input file to said received return information from said ECU device, to determine said test verdict information.

8. The method of claim 1, wherein said first device and said ECU second device are communicatively coupled via said mobile communication third device and a mobile communication fourth device; and said automated testing tool verifies Bluetooth operations of said ECU second device utilizing:
a call initiated automatically by said automated testing tool of said first device from said mobile communication third device to said mobile communication fourth device; or
a call initiated automatically by said automated testing tool of said first device from said mobile communication fourth device to said mobile communication third device;

based on said read test input data.

9. The method of claim 1, wherein said ECU device comprises an embedded system that controls one or more electrical systems or subsystems in a vehicle and said Bluetooth operations of said ECU device include communication via said D-bus with said Bluetooth module based on one or more Bluetooth profiles, after receiving by said ECU device, one or more of an audible voice command, a command in a wireless signal, a command in an optical signal or a command in a wire line signal.

10. A system for automated testing of Bluetooth operations of a Bluetooth module in an electronic control unit (ECU) device for a motor vehicle in communication with a mobile communication device, the system comprising one or more circuits or processors in a first device, said one or more circuits or processors perform:

in an automated testing tool hosted by said first device:
read test input data from text in an input file for testing Bluetooth operations of an ECU device to be used in a motor vehicle, wherein:
said Bluetooth operations of said ECU device controls Bluetooth communication between said ECU device and a first mobile communication device, said first mobile communication device being located within a distance from said ECU device for making a Bluetooth radio connection;
said ECU device comprises two or more layers of software, said two or more layers of software including a Bluetooth module and a test client that tests said Bluetooth module within said Bluetooth module,
said Bluetooth module and said test client communicate within said ECU device via a daemon bus (D-bus),
said Bluetooth module further communicates via a Bluetooth radio within said ECU device to a first mobile communication device, in order to control Bluetooth operations of said first mobile communication device;
establish one or more secure shell sessions with said ECU device for data communication between said first device and said ECU device;
call functions defined in said test client of said ECU device utilizing a first secure shell session;
monitor communication on said D-bus utilizing a second secure shell;
send one or more function calls for said testing operations of said ECU device to said ECU device via said first secure shell sessions, based on said read test input data, wherein said one or more functional calls initiates communication between said Bluetooth module of said ECU device and said first mobile communication device via said Bluetooth radio;

receive by said automated testing tool hosted by said first device, return information from said ECU device via said second secure shell session, wherein said return information corresponds to said Bluetooth operations of said ECU device responsive to said one or more function calls for said testing Bluetooth operations of said ECU device;

compare expected responses from said text in said read test input file to said return information from said ECU device to validate execution of application program interfaces called by said Bluetooth module of said ECU device responsive to said function calls;

determine test pass and test fail verdict information based on said comparison of said expected responses to said return information from said ECU device; and write text in an output file, said text comprising said test pass and said text fail verdict information based on said comparison of said expected responses to said return information from said ECU device.

11. The system of claim 10, wherein said one or more processors or circuits send one or more test parameters corresponding to said one or more function calls to said ECU device via said first secure shell sessions, based on said read test input data.

12. The system of claim 10, wherein said one or more function calls sent to said ECU device enable said test client of said two or more layers of software to simulate a human machine interface module.

13. The system of claim 10, wherein said one or more function calls for said testing said Bluetooth operations of said ECU device are sent from said test client of said two or more layers of software in said ECU device via said D-bus to said Bluetooth module for communicating via said Bluetooth radio in said ECU device to said first mobile device to control said operations in said first mobile communication device communicatively coupled to said Bluetooth radio.

14. The system of claim 10, wherein said automated testing tool in the first device is configured for initializing said Bluetooth radio in said ECU via a third secure shell session wherein said first, second and third secure shell sessions are concurrently maintained in parallel by said automated testing tool to send commands to said ECU device and to monitor said Bluetooth operations of said ECU device, responsive to said one or more function calls for said testing Bluetooth operations of said ECU device.

15. The system of claim 10, wherein said return information comprises information communicated to or from said Bluetooth module via said D-bus, corresponding to said one or more function calls for said testing Bluetooth operations of said ECU device.

16. The system of claim 10, wherein said one or more processors or circuits perform:
in said automated testing tool, compare expected responses from said text in said read test input file to said received return information from said ECU device, to determine said test verdict information.

17. The system of claim 10, wherein said first device and said ECU device are communicatively coupled via said first mobile communication device and a second mobile communication device; and
said automated testing tool verifies Bluetooth operations of said ECU device utilizing:
a call initiated automatically by said automated testing tool of said first device from said first mobile communication device to said second mobile communication device; or
a call initiated automatically by said automated testing tool of said first device from said second mobile communication device to said first mobile communication device;
based on said read test input data.

18. The system of claim 10, wherein said ECU device comprises an embedded system that controls one or more electrical systems or subsystems in a vehicle and said Bluetooth operations of said ECU device include communication via said D-bus with said Bluetooth module based on one or more Bluetooth profiles, after receiving by said ECU device, one or more of an audible voice command, a command in a wireless signal, a command in an optical signal or a command in a wire line signal.

19. A non-transitory computer readable medium having stored thereon one or more instructions for automated testing of Bluetooth operations of a Bluetooth module in an electronic control unit (ECU) device for a motor vehicle in communication with a mobile communication device, said one or more instructions executable by one or more processors to cause the one or more processors to perform steps comprising:
in an automated testing tool hosted by a first device:
reading test input data from text in an input file for testing Bluetooth operations of an ECU device to be used in a motor vehicle, wherein:
said Bluetooth operations of said ECU device controls Bluetooth communication between said ECU device and a first mobile communication device, said first mobile communication device being located within a distance from said ECU device for making a Bluetooth radio connection;
said ECU device comprises two or more layers of software, said two or more layers of software including a Bluetooth module and a test client that tests said Bluetooth module,
said Bluetooth module and said test client communicate within said ECU device via a daemon bus (D-bus),
said Bluetooth module further communicates via a Bluetooth radio within said ECU device to said first mobile communication device, in order to control operations of said first mobile communication device;
establishing one or more secure shell sessions with said ECU device for data communications between said first device and said ECU device;
calling functions defined in said test client of said ECU device utilizing a first secure shell session;
monitoring communication on said D-bus utilizing a second secure shell;
sending one or more function calls for said testing operations of said ECU device to said ECU device via said second secure shell session, based on said read test input data, wherein said one or more functional calls initiates communication between said Bluetooth module of said ECU device and said first mobile communication device via said Bluetooth radio;
receiving by said automated testing tool hosted by said first device, return information from said ECU device via said second secure shell sessions, wherein said return information corresponds to said operations of said ECU device responsive to said one or more function calls for testing operations of said ECU device;

comparing expected responses from said text in said read test input file to said return information from said ECU device to validate execution of application program interfaces called by said Bluetooth module of said ECU device responsive to said function calls;

determining test pass and test fail verdict information based on said comparison of said expected responses to said return information from said ECU device; and writing text in an output file, said text comprising said test pass and said test fail verdict information based on said comparison of said expected responses to said return information from said ECU device.

20. The non-transitory computer readable medium of claim 19, wherein said one or more function calls sent to said ECU device enable said test client of said two or more layers of software to simulate a human machine interface module.

21. The non-transitory computer readable medium of claim 19, wherein said one or more function calls for said testing operations of said ECU device are sent from said test client of said two or more layers of software in said ECU device via said D-bus to said Bluetooth module for communicating via said Bluetooth radio in said ECU device to said first mobile communication device to control said Bluetooth operations in said first mobile communication device communicatively coupled to said Bluetooth radio.

22. The non-transitory computer readable medium of claim 19 further comprising instructions for initializing said Bluetooth radio in said ECU via a third secure shell session wherein said first, second and third secure shell sessions are concurrently maintained in parallel by said automated testing tool to send commands to said ECU device and to monitor said Bluetooth operations of said ECU device responsive to said one or more function calls for said testing operations of said ECU device.

23. The non-transitory computer readable medium of claim 19, wherein said return information comprises information communicated to or from said Bluetooth module via said D-bus, corresponding to said one or more function calls for said testing operations of said ECU device.

24. The non-transitory computer readable medium of claim 19, wherein said first device and said ECU device are communicatively coupled via said first mobile communication device and a second mobile communication device; and
said automated testing tool is operable to verify Bluetooth operations of said ECU device utilizing:
a call initiated automatically by said automated testing tool of said first device from said first mobile communication device to said second mobile communication device; or
a call initiated automatically by said automated testing tool of said first device from said second mobile communication device to said first mobile communication device;
based on said read test input data.

* * * * *